Figure 5:
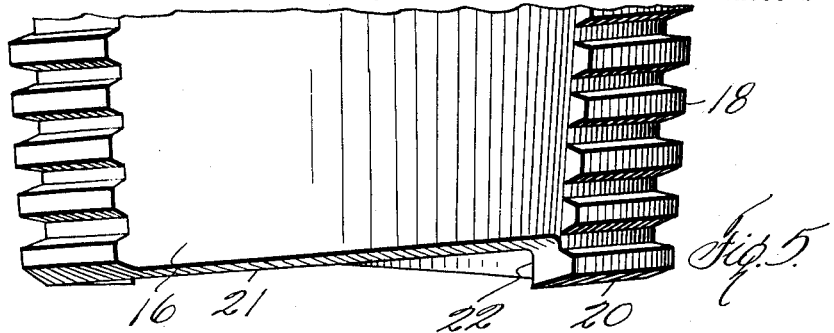

May 26, 1925.
R. A. WILSON
TUBULAR COUPLING
Filed May 15. 1924
1,539,287
2 Sheets-Sheet 1
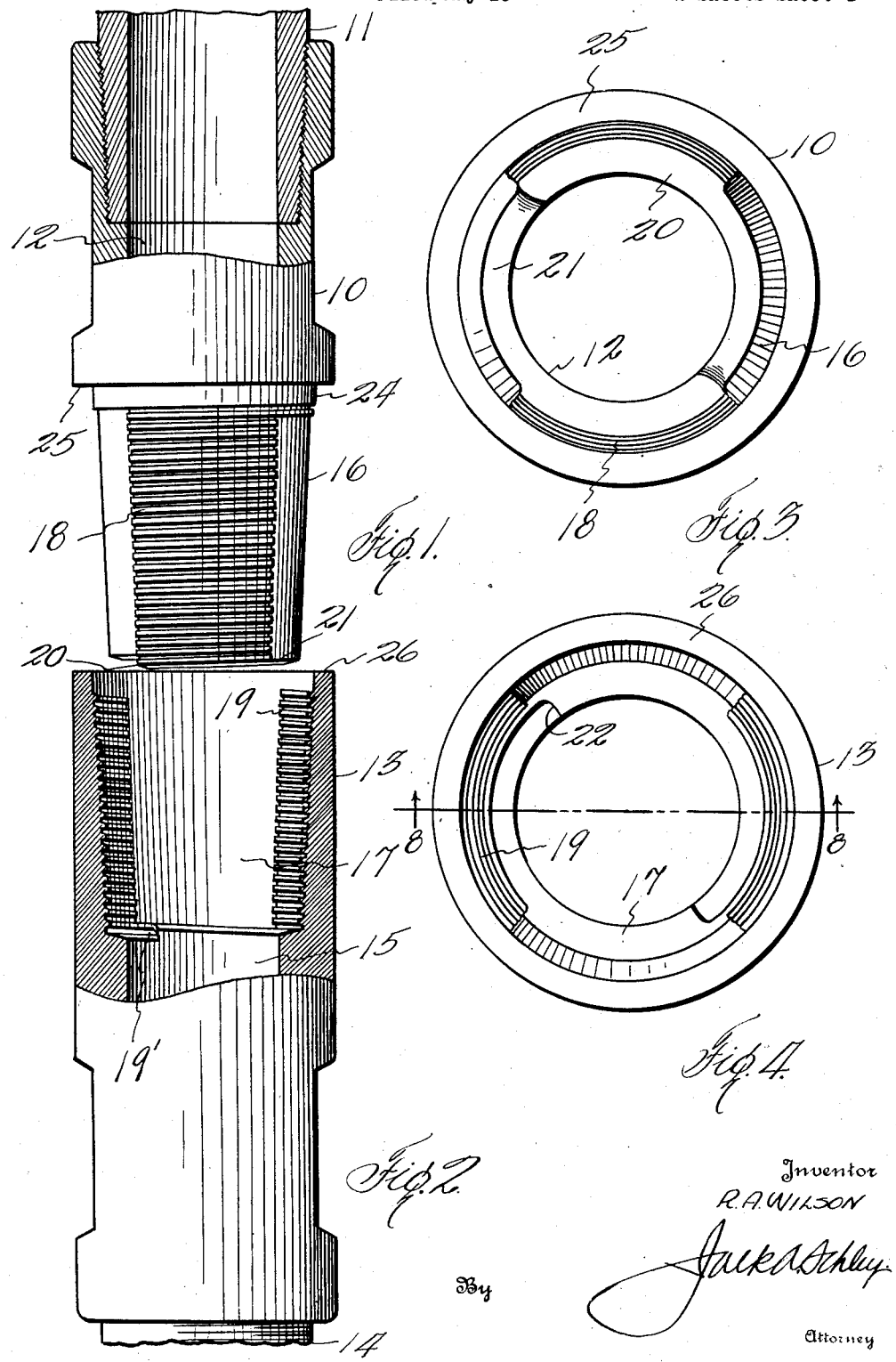
Inventor
R. A. WILSON
By Jack A. Schley
Attorney May 26, 1925.                                                   1,539,287
R. A. WILSON
TUBULAR COUPLING
Filed May 15, 1924                       2 Sheets-Sheet 2

Inventor
R.A. WILSON
By Jack A. Ashley
Attorney

Patented May 26, 1925.

1,539,287

UNITED STATES PATENT OFFICE.

ROBERT A. WILSON, OF DALLAS, TEXAS, ASSIGNOR TO THE GUIBERSON CORPORATION, OF DALLAS, TEXAS, A CORPORATION OF DELAWARE.

TUBULAR COUPLING.

Application filed May 15, 1924. Serial No. 713,419.

*To all whom it may concern:*

Be it known that I, ROBERT A. WILSON, citizen of the United States of America, residing at Dallas, in the county of Dallas and State of Texas, have invented certain new and useful Improvements in Tubular Couplings, of which the following is a specification.

This invention relates to new and useful improvements in tubular couplings.

The invention has particularly to do with improvements in tubular couplings, such as the type which employs a box and a tapered pin, an illustration of which is found in the patent issued to Whittier, on July 12, 1910 and numbered 964,353. By employing the tapered pin and a corresponding well for the same in the box, the parts of the joint or coupling may be connected or disconnected by rotating the pin member a few number of times.

In my co-pending application filed June 6th, 1921, Serial No. 475,470 an improved coupling is set forth, in which, by the use of quadrant panels of threads, the members of the joint may be connected or disconnected by a quarter turn of the pin member. This is an advance in the art, but I have conceived a still further advance.

In coupling tool joints and the like the tapered threaded pin is lowered into the well or threaded socket of the box, which also has threads. The threads of the pin in the Whittier type of joint, are constantly battered by the dropping of the pin into the box, due to the shearing action of one thread catching on another and sustaining the load of the superimposed pipe to which the pin member is attached. In the improved form explained in my co-pending application above referred to, the lower threads of the pin sustain the impact and load, when engaging the thread continuations, upon being dropped into the box. In the latter case the threads of the pin are more likely to be bent or sheared off because they are not continuous, extending only a quadrant of the circumference.

The object of the invention is to so amplify the thread structure and component parts that when the pin is dropped into the box, the impact and load will be sustained, borne and distributed over wide surfaces of substantial areas and not merely upon the thread alone.

A further object of the invention is to provide amplified convolute extensions on the lower edge or bottom of the pin to sustain the impact and load when the pin is dropped into the box.

Another object is to provide a convolute seat, for each thread, at the bottom of the well of the box having a substantial area for supporting the convolute extensions of the pin and for guiding the threads of the pin panels into the threads of the box panels, when the pin member is rotated.

A still further object of the invention is to provide a joint or coupling in which the pin may be dropped with its entire load, into the box without injury to or mutilation of the threads.

A construction designed to carry out the invention will be hereinafter described together with other features of the invention.

Figure 6:
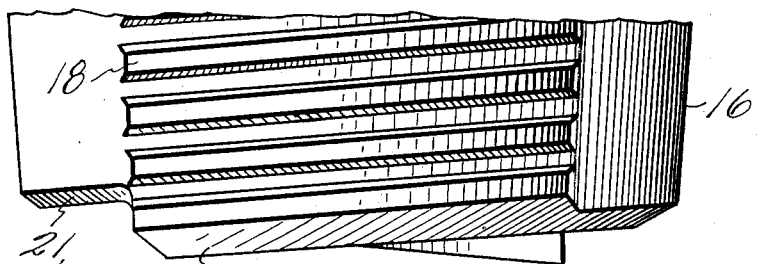
Figure 7:
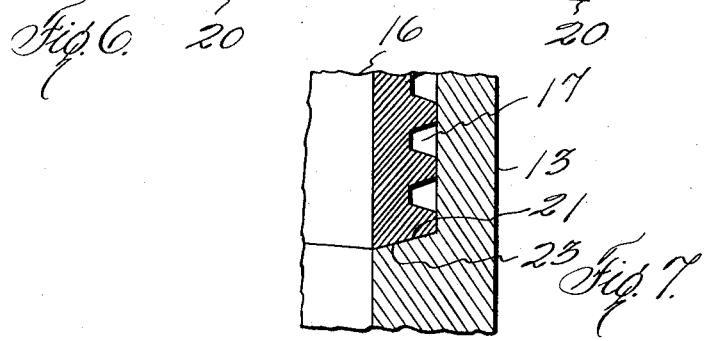
Figure 8:
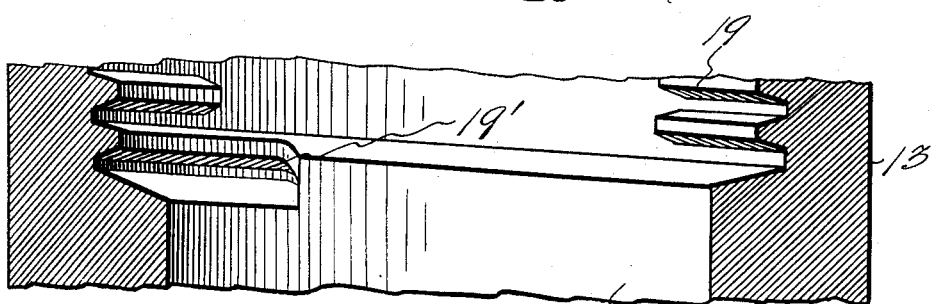

The invention will be more readily understood from a reading of the following specification and by reference to the accompanying drawings, in which an example of the invention is shown, and wherein:

Fig. 1 is an elevation of the pin member of a joint constructed in accordance with my invention, Fig. 2 is a view of a box constructed in according to my invention, a portion being shown in elevation and a portion in section, Fig. 3 is an underside view of the pin member, Fig. 4 is a plan view of the box, Fig. 5 is an enlarged elevation of the improved pin, Fig. 6 is a similar view at right angles to Fig. 5, Fig. 7 is an enlarged vertical sectional view showing one of the shoes or extensions resting on the thread seat at the bottom of the well of the box, prior to the meshing of the threads, and Fig. 8 is a vertical sectional view taken on the line 8—8 of Fig. 4.

In the drawings the numeral 10 designates a pin member which has a screw threaded socket at its upper end to receive the usual screw threaded well tubing, stem, pipe or other tubular conductor 11, with which the joint is used. The member 10 has a longitudinal bore 12.

The pin member 10 constitutes one portion or element of the joint; while a box member 13 constitutes the other element or portion. The lower end of the box is screw threaded to receive the complementary portion 14 of the tubing or other conductor 11. The box has an axial bore 15. The member 10 and box 13 are screwed onto the tubular element 11 and 14 in the usual manner; it being a common practice to make the threads comparatively fine and to taper the parts. This structure may vary according to the use and the particular conductors which are to be coupled. It is the intention to screw the member 10 and the box 13 onto the parts 11 and 14 in such a manner that they will remain so connected when the joint is unscrewed or broken.

The member 10 is provided with a depending tapered pin 16. This pin is not tapered to the degree which has been the practice in this art, its angle of inclination to the perpendicular being much less acute than that of the pins made under Whittier Patent No. 964,353. The box 13 is formed with a countersunk tapering well 17 for receiving said pin.

The pin is provided with mutilated threads 18 arranged in two panels each occupying substantially one quarter of the circumference of the pin and disposed diametrically opposite each other. This provides gaps between the panels. The panels are formed of coarse threads, the convolutions of which are preferably, spaced sufficiently to admit the forming of a second thread of the same pitch, intermediate said convolutions. The second thread is started diametrically opposite from the first thread. From the foregoing it will be seen that one of the threads begins at the lower end of one panel; while the other thread begins at the lower end of the diametrically opposite panel. By this arrangement ample thread bearing is had and a coarse thread is available. It is within the scope of the invention to utilize a single thread.

The well 17 is provided with double threads 19 which are mutilated and formed into diametrically opposite panels having substantially the same width as the gaps between the panels of the pin, so that the pin may be inserted in the well 17 its threads 18 received in the gaps of the well. The members are coupled by rotating the pin member 10 to mesh the threads.

The very important feature of the invention is the provision of a pair of shoes or extensions 20 on the lower or bottom edge of the pin. These shoes extend radially the full thickness of the wall of the pin and conform to the convolutions of the threads, the lower-most threads 19 being formed on the outer peripheries of the shoes. The edges 21 between the shoes are cut back on the same pitch as the opposite thread of the following panel. This causes the entrant end of the shoe to drop off by a shoulder 22. The under sides or faces of the shoes have the same bevel as the threads and with the edges 21, become in effect, amplified threads.

To receive and support the shoes at the bottom of the gaps between the threads 19 of well 17 convolute seats or shoulders 23 are formed contiguous to the threads 19. Each lower thread 19 has a short extension 19' which connects with the seat leading into the next panel. Each seat extends convolutely under the panel in its forward path. The seats have the same pitch and bevel as the threads and shoes.

When the pin is inserted in the box the shoes will engage upon the seats 23 and thread extension 19'. The broad faces of the shoes engaging the wide seats of the boxes will take the impact and sustain the load which would otherwise be imposed upon the threads. In order to mesh the threads 18 and 19 without lifting the pin after it is inserted and simply by rotating, guides at the lower ends of the gaps in the well 17 must be provided. If merely thread extensions or thread convolutions are used, then they must sustain the impact and load. But by the use of the shoes 20 and the seats 23, having the same pitch as the threads, it is obvious that when the pin is rotated its thread 18 will be guided into the threads 19 in a free and easy manner.

The coupling is tightened by a quarter rotation of the member 10. At the upper end of the pin, an annular collar 24 is formed to fit snugly in the upper end of the well above the threads 19 thereof. An annular radial shoulder 25 overhangs the collar 24 and the parts are so proportioned that as the threads are meshed by the rotation of the member 10, the shoulder will frictionally engage the upper flat edge 26 of the box. As the coupling is tightened the frictional contact between the parts 25 and 26 will be increased, whereby the box and pin members will be adequately fastened together. Tests have demonstrated that the members will not unscrew when a drill pipe is rotated in a reverse direction in a well and a wrench is required to uncouple the joint. However the members are coupled or uncoupled by a quarter of a rotation.

Owing to the use of mutilated threads it is not necessary to give as much taper to the pin 16 as where continuous thread coupling for a two inch pipe can only be given an inch and one-eighth bore. It will be apparent that this coupling may be used in various places where it is desired to unite two pipes or tubular conductors.

Various other changes, alterations and modifications may be made within the scope of the appended claims.

What I claim is:

1. A coupling for tubular conductors comprising in combination, a pin member, a tapered pin carried by the pin member and having threads arranged in longitudinal panels on diametrically opposite sides thereof, shoes on the lower end of the pin, a box having a well shaped to receive said pin and provided with threads arranged in spaced vertical panels to mesh with the threads of the pin, and seats at the bottom of the well of the box between the thread panels thereof for receiving the shoes when the pin is inserted in the box, the pin member, pin and box having an axial bore.

2. A coupling for tubular conductors comprising in combination, a pin member, a tapered pin carried by the pin member and having threads arranged in longitudinal panels on diametrically opposite sides thereof, radially extending shoes, a box having a well shaped to receive said pin and provided with threads arranged in spaced vertical panels to mesh with the threads of the pin, and seats at the bottom of the well of the box between the thread panels thereof for receiving the shoes when the pin is inserted in the box, the pin member, pin and box having an axial bore.

3. A coupling for tubular conductors comprising in combination, a pin member, a tapered pin carried by the pin member and having threads arranged in longitudinal panels on diametrically opposite sides thereof, radially extending shoes on the bottom edge of the pin at the lower ends of the thread panels thereof, a box having a well shaped to receive said pin and provided with threads arranged in spaced vertical panels to mesh with the threads of the pin, and seats at the bottom of the well of the box between the thread panels thereof for receiving the shoes when the pin is inserted in the box, the pin member, the pin and box having an axial bore.

4. A coupling for tubular conductors comprising in combination, a tapered pin having an axial bore, thread panels spaced circumferentially of the pin, shoes on the lower edge of the pin having the same pitch as the threads of the panels, a box having a well shaped to receive said pin and provided with threads arranged in spaced vertical panels to mesh with the threads of the pin, and seats at the bottom of the well of the box between the thread panels thereof for receiving the shoes when the pin is inserted in the box, the box also having an axial bore registering with the bore of the pin.

5. As a sub-combination in a coupling for tubular conductors, a pin for a box, said pin having longitudinal thread panels on diametrically opposite sides, and shoes extending from the end of the pin each having the bottom thread of one of the panels thereon and also having its under face bevelled at the same pitch as the threads and extending inwardly of the threads.

6. As a sub-combination in a coupling for tubular conductors, a box for a tapered pin having shoes, said box having a well provided with vertical thread panels and gaps therebetween, said box having amplified seats at the bottoms of said gaps conforming to the bevel and pitch of the shoes and leading into its thread panels.

7. A coupling for tubular conductors comprising in combination, a tapered and bored pin having threads arranged in diametrically opposite panels, shoes extending from the end of the pin and carrying the lowermost threads of the panels of the pin, said shoes extending radially the full thickness of the end of the pin and having substantially the same bevel and pitch as the threads, a box having a well and a bore, thread panels on opposite sides of the well located to receive the threads of the pin, there being gaps between the thread panels of the well, and seats at the bottom of the well in continuity to the threads thereof, said seats being deeper than the threads and having substantially the same pitch and bevel as the shoes.

8. A coupling for tubular conductors comprising in combination, a tapered pin having diametrically opposite thread panels, the threads being double, and amplified bearing extensions on the end of the pin having a greater width radially than the depth of the threads, a box having a well provided with diametrically thread panels, the threads being double, and amplified bearing seats in the well between the panels having a greater width radially than the threads and receiving the extensions when the parts are initially coupled.

9. A coupling for tubular conductors comprising in combination, a tapered pin having sector threads and amplified bearing faces on its lower ends, and a box having well provided with sector threads and gaps between the threads for receiving the threads of the pin when said pin is dropped into said well without being rotated and amplified seats at the bottom of the well located between the box threads for arresting and sustaining said pin when the latter is dropped into the well and said bearing faces engaged upon said seats.

In testimony whereof I affix my signature.

ROBERT A. WILSON.